United States Patent
Ahlers et al.

(10) Patent No.: US 12,318,641 B2
(45) Date of Patent: *Jun. 3, 2025

(54) FIRE PROTECTION ELEMENT FOR SEALING PASSAGE OPENINGS IN COMPONENTS

(71) Applicant: Hilti Aktiengesellschaft, Schaan (LI)

(72) Inventors: Andreas Ahlers, Westendorf (DE); Sebastian Simon, Lindenberg (DE)

(73) Assignee: Hilti Aktiengesellschaft, Schaan (LI)

( * ) Notice: Subject to any disclaimer, the term of this patent is extended or adjusted under 35 U.S.C. 154(b) by 962 days.

This patent is subject to a terminal disclaimer.

(21) Appl. No.: 17/287,641

(22) PCT Filed: Oct. 23, 2019

(86) PCT No.: PCT/EP2019/078787
§ 371 (c)(1),
(2) Date: Apr. 22, 2021

(87) PCT Pub. No.: WO2020/083955
PCT Pub. Date: Apr. 30, 2020

(65) Prior Publication Data
US 2021/0394000 A1  Dec. 23, 2021

(30) Foreign Application Priority Data
Oct. 24, 2018  (EP) .................................. 18202268

(51) Int. Cl.
*A62C 2/06* (2006.01)
*B32B 5/02* (2006.01)
(Continued)

(52) U.S. Cl.
CPC .............. *A62C 2/065* (2013.01); *B32B 5/024* (2013.01); *B32B 5/18* (2013.01); *B32B 5/245* (2013.01);
(Continued)

(58) Field of Classification Search
CPC ........... A62C 2/065; B32B 5/024; B32B 5/18; B32B 5/245; B32B 5/42; B32B 15/046;
(Continued)

(56) References Cited

U.S. PATENT DOCUMENTS 4,194,521 A * 3/1980 Banta ....................... A62C 3/16
137/67
4,612,239 A   9/1986 Dimanshteyn
(Continued)

FOREIGN PATENT DOCUMENTS

EP  1 215 420         6/2002
EP  3023468 A1 * 5/2016 ............... A62C 8/00
(Continued)

OTHER PUBLICATIONS

International Search Report issued Feb. 5, 2020 in PCT/EP2019/078787, with English translation, 5 pages.
(Continued)

*Primary Examiner* — Qingzhang Zhou
*Assistant Examiner* — Kevin Edward Schwartz
(74) *Attorney, Agent, or Firm* — Grüneberg and Myers PLLC (57) ABSTRACT

A fire protection element contains a layered body for sealing passage openings in components, such as building components, through which lines are guided. A method can be used for producing the fire protection element and the fire protection element can be used for sealing passage openings and/or joints in components against fire and flue gases.

22 Claims, 4 Drawing Sheets

(51) Int. Cl.
  *B32B 5/18* (2006.01)
  *B32B 5/24* (2006.01)
  *B32B 5/32* (2006.01)
  *B32B 15/04* (2006.01)
  *B32B 15/20* (2006.01)
  *E04B 1/94* (2006.01)
  *F16L 5/04* (2006.01)

(52) U.S. Cl.
  CPC ............. *B32B 5/32* (2013.01); *B32B 15/046* (2013.01); *B32B 15/20* (2013.01); *E04B 1/947* (2013.01); *E04B 1/948* (2013.01); *F16L 5/04* (2013.01); *B32B 2262/101* (2013.01); *B32B 2264/101* (2013.01); *B32B 2264/102* (2013.01); *B32B 2266/0242* (2013.01); *B32B 2266/045* (2013.01); *B32B 2307/3065* (2013.01)

(58) Field of Classification Search
  CPC ............. B32B 15/20; B32B 2262/101; B32B 2264/101; B32B 2264/102; B32B 2266/0242; B32B 2266/045; B32B 2307/3065; E04B 1/947; E04B 1/948; F16L 5/04
  USPC .......................................................... 169/45
  See application file for complete search history.

(56) References Cited

U.S. PATENT DOCUMENTS

| | | | | |
|---|---|---|---|---|
| 4,687,702 A | * | 8/1987 | Monsees | C08J 9/365 428/313.5 |
| 4,816,312 A | * | 3/1989 | Annemaier | C09K 21/14 523/179 |
| 5,498,466 A | | 3/1996 | Navarro et al. | |
| 5,607,787 A | * | 3/1997 | Wedlake | A62C 3/16 429/62 |
| 5,800,905 A | * | 9/1998 | Sheridan | F16L 59/08 156/251 |
| 6,862,852 B1 | * | 3/2005 | Beele | F16L 5/04 52/220.8 |
| 8,230,659 B2 | * | 7/2012 | Langille | E06B 5/161 52/213 |
| 9,097,011 B1 | * | 8/2015 | Barone | B05D 7/02 |
| 2004/0157012 A1 | * | 8/2004 | Miller | A62C 2/06 428/34.1 |
| 2005/0031843 A1 | * | 2/2005 | Robinson | B32B 33/00 428/921 |
| 2008/0063875 A1 | * | 3/2008 | Robinson | B32B 17/02 428/446 |
| 2011/0314755 A1 | | 12/2011 | Langille et al. | |
| 2013/0118764 A1 | * | 5/2013 | Porter | B32B 5/022 169/48 |
| 2014/0147615 A1 | * | 5/2014 | Fernando | B32B 5/24 428/688 |
| 2019/0226609 A1 | * | 7/2019 | Mantyla | F16L 5/04 |
| 2021/0316177 A1 | * | 10/2021 | Ahlers | F16L 5/04 |
| 2021/0353984 A1 | * | 11/2021 | Simon | E04B 1/948 |
| 2022/0111236 A1 | * | 4/2022 | Simon | E04B 1/948 |

FOREIGN PATENT DOCUMENTS

| | | | |
|---|---|---|---|
| EP | 2942193 B1 | * 10/2018 | .......... B32B 27/065 |
| WO | 2018/016580 | 1/2018 | |

OTHER PUBLICATIONS

Written Opinion issued Feb. 5, 2020 in PCT/EP2019/078787, with English translation, 8 pages.
U.S. Appl. No. 17/287,573, filed Apr. 22, 2021, Simon et al.
U.S. Appl. No. 17/287,597, filed Apr. 22, 2021, Ahlers et al.
U.S. Appl. No. 17/287,625, filed Apr. 22, 2021, Simon et al.
International Search Report received for PCT Application No. PCT/EP2019/078786, mailed on Feb. 5, 2020, 5 pages with English translation.
Written Opinion received for PCT Application No. PCT/EP2019/078786, mailed on Feb. 5, 2020, 8 pages with English translation.

* cited by examiner

FIRE PROTECTION ELEMENT FOR SEALING PASSAGE OPENINGS IN COMPONENTS

CROSS-REFERENCE TO RELATED APPLICATIONS

This application is the National Stage entry under § 371 of International Application No. PCT/EP2019/078787, filed on Oct. 23, 2019, and which claims the benefit of European Application No. 18202268.1, filed on Oct. 24, 2018. The content of each of these applications is hereby incorporated by reference in its entirety.

BACKGROUND OF THE INVENTION

Field of the Invention

The present invention relates to a fire protection element comprising a layered body for sealing passage openings in components, such as building components, through which conduits are guided. The present invention also relates to a method for producing the fire protection element according to the invention and to the use of the fire protection element for sealing passage openings and/or joints in components against fire and flue gases.

Description of Related Art

When installing conduits, such as pipelines, electrical cables and the like, they are guided through passage openings in components, in particular building components, such as walls and ceilings. In order to prevent the passage of fire and flue gases in the event of a fire, fire protection elements are introduced between the inner walls of the passage openings and the conduits guided therethrough, and into joints. These fire protection elements are usually provided with intumescent materials or formed from these, so that the material expands under the effect of heat, as occurs in the event of a fire, and thereby presses on the conduit and closes the passage opening in the component.

As a rule, known fire protection elements have a carrier material to which additives are added for the purposes of fire protection. These additives expand or intumesce at elevated temperatures, such as in the event of a fire, and form an insulating layer in combination with the carrier material and optionally further additives, thus closing any opening that may occur.

For production-related reasons, the manufacture of the known fire protection elements involves the carrier material, including the intumescent additives, being applied to a film or a woven fabric, such as a glass fiber grid. The fire protection elements produced in this way thus have a two-layer structure.

Furthermore, fire protection elements are also known which have a multilayer structure. For instance, WO2009/099755 A1 describes an intumescent fire protection element in the form of an adhesive film or adhesive tape roll for the protection of steel structures. The fire protection element comprises laminated layers of an intumescent material, a reinforcing matrix, a pressure-sensitive adhesive and a separation layer. To ensure adequate fire protection, the reinforcing matrix is selected such that it loses structural strength at elevated temperatures and thus a physical separation is made possible within the reinforcing matrix.

A physically acting blowing agent is often used in the known fire protection elements. The physically acting blowing agents often have a structural anisotropy, which means that they may for example be layered in the form of flakes; however, it is also possible that the physically acting blowing agent shows substantially no structural anisotropy. This is the case for example when the physically acting blowing agent is in the form of beads. The physically acting blowing agent is randomly distributed and aligned within the carrier material such that, in the event of a fire, an expansion takes place in all three spatial directions. When the expansion of the physically acting blowing agent is considered in one spatial direction, this expansion is in each case "upward" and "downward". The simplified consideration of the expansion in one spatial direction already shows that opposing forces ("upward" and "downward") lead to mutual hindrance of the physically acting blowing agent during the expansion. The greater the structural anisotropy of the physically acting blowing agent, the more pronounced this effect becomes. This leads to a phenomenon known as "negative intumescence", which describes the loss of theoretically existing expansion or intumescent potential caused by the mutual hindrance of the physically acting blowing agent during expansion.

Furthermore, in the course of the expansion there is compression of the already expanded material because the already expanded material is compressed by material that has not yet expanded. Thus, overall, the expansion of the physically acting blowing agent to the passage center in order to close the passage is hindered. The compression that occurs means that the existing expansion or intumesce potential of the physically acting blowing agent can be utilized only to an extent. Furthermore, the compression causes an increase in the thermal conductivity, as a result of which there is a more rapid increase in temperature on the side facing away from the fire, which is associated with an increased risk of fire penetration.

These adverse effects are particularly noticeable in fire protection elements for larger opening cross sections and in the case of conduits with late melting or thick walls, in which large amounts of physically acting blowing agents are used to ensure a reliable closure of the passage opening in the event of a fire. The problems described above are therefore to be observed here to a greater extent. In addition, these fire protection elements sometimes have a high weight, as a result of which their installation is difficult. Additionally, the use of large amounts of physically acting blowing agents is disadvantageous from both an ecological and economical point of view.

SUMMARY OF THE INVENTION

There is therefore a need for fire protection elements by means of which a gap between an inner surface of a passage opening and a conduit guided therethrough can be reliably sealed in the event of a fire and which means that compression of the physically acting blowing agent during expansion occurs to a lesser extent or is largely prevented, and consequently the conduit guided through is pressed on to a greater extent.

In addition, an object of the present invention is to provide a fire protection element which makes it possible to reduce the amount of material used, in particular the amount of physically acting blowing agent, without the performance of the fire protection element, in particular with regard to its closure ability, the inflation pressure emanating from the fire protection element or the resulting ash stability or ash crust stability in the event of a fire being compromised. It is in particular an object of the present invention to provide a fire protection element by means of which a reduction in the amount of physically acting blowing agent in the fire protection element is made possible and by means of which, at the same time, improved performance of the fire protection element, in particular with regard to its closure ability, the inflation pressure emanating from the fire protection element and the resulting ash stability or ash crust stability in the event of a fire can be achieved.

The object is achieved by a fire protection element and by a method according to the description below.

Further embodiments are also provided in the description.

DETAILED DESCRIPTION OF THE INVENTION

According to a first aspect of the present invention, a fire protection element is provided comprising a layered body (11) containing at least two fire protection layers (2) and at least one functional layer (3) arranged between the fire protection layers (2),
i) the fire protection layers (2) each comprising a carrier material (4) and at least one physically acting blowing agent (5) and
ii) the functional layer (3) having a temperature resistance up to at least 300° C.,
characterized in that, in order to form the layered body (11), the fire protection layers (2) and the functional layer (3) arranged between the fire protection layers are substantially firmly bonded to one another and the functional layer (3) comprises at least one semi-rigid material.

One concept of the above-mentioned fire protection element is that of providing a layered body in which at least one functional layer is arranged between two or more fire protection layers and is able to counteract a compression of the physically acting blowing agent in the course of the expansion by the inflation pressure emanating from the fire protection layers being distributed to the intermediate functional layer. In addition to sufficient mechanical strength to compensate for the inflation pressure, the functional layer has to be sufficiently flexible so that the expansion of the physically acting blowing agent is not hindered. These features are realized by a semi-rigid material.

For a better understanding of the invention, the following explanations of the terminology used herein are considered useful. In the context of the invention:

the term "carrier material" describes a composition comprising one or more polymers. The carrier material is characterized in that the polymer or polymers form a continuous phase;

the term "firmly bonded" describes a bond between two layers which results from molecular forces and holds the layers together in such a way that they form a solid body in their entirety. A firm bond can be produced for example by welding, soldering or gluing. The separation of a firm bond is often possible only by destroying the elements that were connected to one other by a firm bond.

the term "form-fitting" describes a connection between two materials which results from at least two connecting parts interlocking. In the context of the present invention, a form-fit connection can be produced in particular by the plastic deformability of the fire protection layer being used to bring about interlocking with the functional layer.

"physical intumescence" means the formation of a voluminous, insulating layer by means of expansion of a compound that releases gases under the effect of heat, without a chemical reaction between two compounds having taken place, thereby causing the volume of the compound to increase by a multiple of the original volume. In the context of the present invention, the term "physically acting blowing agent" means a material or a component which is capable of exhibiting physical intumescence when a certain temperature, the so-called activation temperature, is exceeded;

the term "thermal expansion" or simply "expansion" means the volume increase of a material or a component caused by physical and/or chemical intumescence;

a "polymer" is a molecule having six or more repetition units, which can have a structure that can be linear, branched, star-shaped, twisted, hyper-branched or crosslinked; polymers can have a single type of repetition unit ("homopolymers") or they can have more than one type of repetition unit ("copolymers");

the term "solids content" means the content of non-volatile proportions of a composition. The solids content is determined according to DIN EN ISO 3251 (2008);

"contain" and "comprise" mean that further constituents may be present in addition to those mentioned. These terms are intended to be inclusive and therefore also encompass the term "consist of". "Consist of" is intended to be exclusive and means that no further constituents may be present. In a preferred embodiment, the terms "contain" and "comprise" mean the term "consist of";

a range limited by numbers, e.g. "5 to 60 wt. %", means that the two extreme values and any value within this range are disclosed individually.

The fire protection element according to the present invention comprises a layered body of at least two fire protection layers and at least one functional layer arranged between the fire protection layers, wherein the fire protection layers and the functional layer arranged between the fire layers are substantially firmly bonded to one another. The layered body according to the present invention thus comprises a three-layer structure in the simplest embodiment. However, it is also possible for the layered body to have further fire protection layers and/or functional layers. In this case, it is advantageous for the layered body to have an alternating structure of fire protection layers and functional layers, i.e. for the layered body to be made up of a sequence of identical or different fire protection layers and identical or different functional layers, with the fire protection layers and functional layers adjacent to one another in each case advantageously being substantially firmly bonded to one another.

The term "substantially firmly bonded" in the context of the present invention is to be understood as meaning that the materials of two adjacent layers (fire protection layer and functional layer) are firmly bonded to one another to a great extent. In some cases, the functional layer may have "holes" due to its geometry. The term "substantially firm bond" in these cases refers to the actual material from which the functional layer is formed, and the "holes" are disregarded. In addition, the surface condition of the functional layer can determine whether a planar firm bond, a spatial firm bond or mixtures thereof are achieved between the fire protection layer and the functional layer. In the case of a spatial firm bond, substantially the entire material surface of the functional layer is connected to the fire protection layer. In cases where the functional layer has a pronounced three-dimensional structure, it may be the case that only the highest- or lowest-lying material of the functional layer is firmly bonded to the fire protection layer, rather than the entire material surface of the functional layer. This is known as a planar firm bond. In order to be able to achieve the effect of the invention, a substantially planar firm bond is sufficient, but it is preferred for there to be a substantially spatial firm bond between the fire protection layer and the functional layer.

For production-related reasons, for example, in the case of smaller areas of two adjacent layers, it may not be possible for a planar or spatial firml bond to occur and the surfaces of the layers may merely rest on one another at these points. Corresponding layered bodies are also considered to be according to the invention and are suitable for use in the fire protection element according to the invention. Preferably, at least 40%, more preferably 60%, even more preferably 80% of the adjacent areas of the fire protection layer and the functional layer are firmly bonded to one another in a planar manner, in particular firmly bonded in a spatial manner, within the layered body. It has been found to be particularly advantageous if, within the layered body, at least 90%, more preferably at least 95% and particularly preferably 98% of all fire protection layers and functional layers adjacent to one another are firmly bonded to one another in a planar manner, in particular firmly bonded in a spatial manner.

Alternatively or additionally, the fire protection layers (2) and the functional layer (3) arranged between the fire protection layers can be interconnected substantially in a form-fitting manner in order to achieve the effect essential to the invention.

The layered body according to the present invention comprises at least two fire protection layers and at least one functional layer arranged between the fire protection layers.

The fire protection layers each comprise at least one carrier material and at least one physically acting blowing agent.

The carrier material of the fire protection layers present in the layered body can be the same or different. In a preferred embodiment, the fire protection layers comprise the same carrier material. The carrier material preferably comprises a polymer dispersion based on water or solvent, in particular an aqueous polymer dispersion. Examples of aqueous polymer dispersions which have proven particularly useful are aqueous acrylate dispersions, aqueous dispersions or emulsions of urea resins, formaldehyde resins or melamine resins, polyvinyl acetates, polyvinyl alcohols, acrylonitrile, styrene acrylates and their copolymers.

The carrier material preferably comprises an aqueous acrylate (copolymer) dispersion, more preferably an aqueous dispersion of a polyalkyl (meth)acrylate and/or an alkyl (meth)acrylate copolymer. These are preferably aqueous dispersions which are obtained by polymerization, in particular by emulsion polymerization of alkyl (meth)acrylates and/or by copolymerization of alkyl (meth)acrylates with themselves and/or with copolymerizable comonomers, such as preferably (meth)acrylic acid, (meth)acrylamide, styrene, itaconic acid, acrylonitrile and/or citraconic acid, the alkyl groups of the alkyl (meth)acrylates preferably having 1 to 6 C atoms, more preferably 1 to 4 C atoms. Particularly preferred according to the invention are aqueous dispersions of polybutyl acrylate, polyethylhexyl acrylate or alkyl (meth)acrylate-styrene copolymers. The acrylate (copolymer) dispersion may contain both homopolymers and copolymers or mixtures of homopolymers and/or copolymers and, preferably with a pH in the range of from 7 to 9, preferably a pH of 8, which is adjusted if necessary with dilute sodium hydroxide solution or ammonia solution, is mixed with the other constituents. This aqueous acrylate (copolymer) dispersion preferably has a solids content of from 40 to 90 wt. %, more preferably 50 to 80 wt. %. The acrylate (copolymer) dispersions preferably used according to the invention are known to a person skilled in the art and are commercially available. The curing takes place physically by drying.

It is further preferred for the carrier material to have a softening or decomposition point in the temperature range of from 80° C. to 500° C., preferably from 90° C. to 400° C., more preferably from 110° C. to 300° C. By appropriately selecting the softening or decomposition temperature of the carrier material of the fire protection layers, it is possible to influence the interaction between the functional layer and the physically acting blowing agent.

According to the invention, the fire protection layers comprise at least one physically acting blowing agent. The physically acting blowing agents of the fire protection layers present in the layered body can be the same or different. In a preferred embodiment, the fire protection layers of the layered body comprise the same physically acting blowing agent.

In a particularly preferred embodiment of the invention, the fire protection layers comprise both the same carrier material and the same physically acting blowing agent.

The physically acting blowing agent is preferably selected from the group consisting of graphite intercalation compounds (also known as expandable graphite), phyllosilicate intercalation compounds, perlites, and combinations thereof.

Preferably, the physically acting blowing agent is a layered, physically acting blowing agent.

In the context of the present invention, the term "layered" is understood to mean a material which is structurally anisotropic in the form of layers. The layered structure is due to the fact that the interactions within a layer are much more pronounced than between the layers. In the context of the present invention, this means in particular that covalent bonds are present within the layers, with only weak interaction in the form of electrostatic and/or van der Waals forces acting between the layers.

Preferably, the layered, physically acting blowing agent is in the form of flakes.

The layered, physically acting blowing agent is preferably selected from the group consisting of graphite intercalation compounds, phyllosilicate intercalation compounds and combinations thereof, with graphite intercalation compounds or expandable vermiculite being preferred.

The average particle size of the layered, physically acting blowing agent can be within a broad range depending on the application. Preferably, the layered, physically acting blowing agent has an average particle size of from 50 μm to 4.0 mm, preferably from 80 μm to 3.5 mm and particularly preferably from 100 μm to 3.0 mm. The average particle size can be determined by the methods known to a person skilled in the art, for example by means of sieving analysis according to DIN 66165 (2016).

Known intercalation compounds of $SO_x$, $NO_x$, halogen, acetic acid, nitric acid and/or strong acids in graphite can be considered as examples of graphite intercalation compounds. These are also referred to as graphite salts. Graphite intercalation compounds that give off $SO_2$, $SO_3$, NO and/or $NO_2$ while expanding at temperatures (activation temperatures) of from 120 to 350° C., for example, are preferred. Expandable graphites suitable for the present invention are commercially available.

Preferably, the graphite intercalation compounds have an average particle size of from 50 μm to 1.0 mm, preferably from 70 μm to 0.7 mm and particularly preferably from 90 μm to 0.5 mm.

Suitable phyllosilicate intercalation compounds (expandable phyllosilicates) are, for example, those compounds which can be obtained by incorporation of intercalation compounds into native, expandable phyllosilicates, in particular native vermiculite. Representatives of the alcoholates of lithium and potassium and salts of lithium, sodium and potassium with organic acids and/or aqueous solutions thereof, which are incorporated into the native phyllosilicate by cation exchange, are preferred as the intercalation compound. In this regard, reference is made to DE 1029083 A1 and the literature cited therein, e.g. EP 0 429 246 A1, the contents of which are hereby incorporated into this application.

The phyllosilicate intercalation compounds preferably have an average particle size of from 100 μm to 4.0 mm, preferably from 120 μm to 3.5 mm and particularly preferably from 150 μm to 3.0 mm.

In a preferred embodiment of the invention, all the fire protection layers of the layered body comprise the same or different graphite intercalation compounds, in particular all the fire protection layers of the layered body comprise the same graphite intercalation compound.

To construct the fire protection layers, the physically acting blowing agent can be embedded within the carrier material and/or applied to one or more areas of the surface of the carrier material.

In a preferred embodiment, the physically acting blowing agent is embedded within the carrier material. Preferably, the physically acting blowing agent is distributed substantially uniformly within the carrier material. However, it is also possible for the concentration of the physically acting blowing agent in the carrier material to vary. For instance, the concentration of the physically acting blowing agent may also be varied in a punctiform, pattern-like, planar and/or sandwich-like manner.

In a further preferred embodiment, the physically acting blowing agent is applied to one or more areas of the surface of the carrier material, in particular at least to the area facing the functional layer.

In a further preferred embodiment, the physically acting blowing agent is both embedded within the carrier material and applied to one or more areas of the surface of the carrier material.

Depending on the application, the physically acting blowing agent can be present in the fire protection layer in a very broad weight percent range. However, it is preferred for the physically acting blowing agent to be contained in the relevant fire protection layer in an amount of from 10 to 90 wt. %, preferably from 15 to 70 wt. %, more preferably from 20 to 55 wt. % based on the sum of the solids content of the carrier material and the physically acting blowing agent.

Preferably, the amount of physically acting blowing agent is from 8 to 70 wt. %, preferably from 12 to 55 wt. % and in particular from 15 to 40 wt. % based on the total weight of the layered body.

The carrier material may further comprise at least one organic and/or inorganic fiber which is selected in particular from the group consisting of glass fiber, ceramic fiber, carbon fiber, polyamide fiber, metal fiber, boron fiber, natural fiber, rock fiber and mixtures thereof. Particularly suitable fibers are glass fibers and/or metal fibers, in particular made of E-glass, silicate fibers or mineral wool fibers.

The organic or inorganic fibers preferably have a length of from 1 mm to 25 mm, more preferably from 2 mm to 20 mm, and particularly preferably from 3 mm to 15 mm. By way of example, glass fibers from STW can be mentioned here.

The organic or inorganic fibers are preferably contained in the relevant fire protection layer in an amount of from 0.1 to 25.0 wt. %, preferably from 0.5 to 15.0 wt. %, particularly preferably from 1.0 to 6.0 wt. % based on the sum of the solids content of the carrier material and the physically acting blowing agent.

Because the ash crust formed in the event of a fire may be too unstable and, depending on its density and structure, may therefore be blown away by air streams, which has a negative effect on the sealing effect of the fire protection element, the carrier material may additionally contain at least one ash crust stabilizer.

An "ash crust stabilizer" is a so-called skeleton-forming compound which stabilizes the carbon skeleton (ash crust) formed from the physically acting blowing agent and the carrier material. In this connection, the fundamental mode of action is that the inherently very soft carbon layers being formed are inter alia mechanically strengthened by inorganic compounds. The addition of such an ash crust stabilizer contributes to significant stabilization of the intumescence crust in the event of a fire, because these additives increase the mechanical strength of the intumescent layer and/or prevent it from falling off, as a result of which the insulating effect is maintained or enhanced.

The compounds commonly used in fire protection formulations and known to a person skilled in the art, for example particulate metals, such as aluminum, magnesium, iron and zinc, may be considered as ash crust stabilizers or skeleton formers. The particulate metal can be present in the form of a powder, flakes, scales, fibers, threads and/or whiskers, the particulate metal in the form of powder, flakes or scales having a particle size of ≤5.50 μm, preferably of from 0.5 to 10 μm. If the particulate metal is used in the form of fibers, threads and/or whiskers, a thickness of from 0.5 to 10 μm and a length of from 10 to 50 μm are preferred. Alternatively or additionally, an oxide or a compound of a metal of the group comprising aluminum, magnesium, iron or zinc may be used as the ash crust stabilizer, in particular iron oxide, preferably iron trioxide, titanium dioxide, and/or a borate such as zinc borate. Examples of such additives are also found in U.S. Pat. No. 4,442,157 A, U.S. Pat. No. 3,562,197 A, GB 755 551 A, as well as EP 138 546 A1.

Preferably, the ash crust stabilizer is a phosphorus-containing compound selected from salts and derivatives of the oxoacids of phosphorus. The oxoacids of phosphorus are used because their range is very large. The oxoacids of phosphorus are phosphoric acid ($H_3PO_4$) (also referred to as orthophosphoric acid), diphosphoric acid ($H_4P_2O_7$) (also referred to as pyrophosphoric acid), triphosphoric acid ($H_5P_3O_{10}$), polyphosphoric acid ($H_{n+2}PnO_{3n+1}$), polymetaphosphoric acid (($HPO_3)_n$), hypophosphoric acid ($H_4P_2O_6$) (also diphosphoric (IV) acid), diphosphoric (III, V) acid ($H_4P_2O_6$), phosphonic acid ($H_3PO_2(2)$), where the number in the parenthesis designates the maximum base of the acid, if this is different from the total number of H atoms in the formula, (also referred to as phosphorous acid), diphosphonic acid ($H_4P_2O_5(2)$), where the number in the parenthesis designates the maximum base of the acid, if this is different from the total number of H atoms in the formula (also referred to as diphosphorous acid), phosphinic acid ($H_3PO_2$ (1)), where the number in the parenthesis designates the maximum base of the acid, if this is different from the total number of H atoms in the formula.

The following may be mentioned by way of example as phosphoric acid compounds: monoammonium phosphate, diammonium phosphate, ammonium phosphate, ammonium polyphosphate, melamine phosphate, melamine polyphosphates, melamine resin phosphates, potassium phosphate, polyol phosphates such as, for example, pentaerythritol phosphate, glycerol phosphate, sorbitol phosphate, mannitol phosphate, dulcitol phosphate, neopentyl glycol phosphate, ethylene glycol phosphate, dipentaerythritol phosphate and the like. Preferably, a polyphosphate or an ammonium polyphosphate is used as a phosphoric acid compound. In this regard, melamine resin phosphates are understood to be compounds such as the reaction products of Lamelite C (melamine-formaldehyde resin) with phosphoric acid.

The ash crust stabilizer is preferably present in an amount of from approximately 5 to 35 wt. %, preferably 7 to 30 wt. %, particularly preferably 10 to 28 wt. %, in the relevant fire protection layer, based on the sum of the solids content of the carrier material and the physically acting blowing agent.

In addition, other fire protection additives, in particular those which cause chemical intumescence, and those which act ablatively, may be contained in the composition. "Chemical intumescence" means the formation of a voluminous, insulating ash layer by means of compounds which are coordinated with one another and which react with one another under the effect of heat. These are generally a carbon source, an acid former and a gas former.

A "carbon source" is an organic compound which, due to incomplete combustion, leaves behind a carbon skeleton and is combusted incompletely to form carbon dioxide and water (carbonization). These compounds are also known as "carbon-skeleton formers". An "acid former" is a compound which, under the effect of heat, i.e. above approximately 150° C., forms a non-volatile acid, for example due to decomposition, and thereby acts as a catalyst for carbonization. In addition, it may contribute to lowering the viscosity of the melt of the carrier material; the term "dehydrogenation catalyst" is used synonymously in this context. A "gas former" is a compound which decomposes at an elevated temperature with the development of inert, i.e. non-combustible, gases and expands the carbon skeleton formed by the carbonization and optionally the softened binder into a foam (intumescence).

Optionally, the carrier material may contain other conventional additives, such as plasticizers, fillers, pigments, additives for adjusting the rheological properties, thickeners, dispersants, emulsifiers, biocides, fungicides, preservatives and anti-aging agents, antifreeze agents, wetting agents, defoamers and/or skin-formation retardants. These other additives are commercially available products known to a person skilled in the art.

Fillers which can be used are the fillers commonly used and known to a person skilled in the art. The following can be mentioned by way of example as fillers: Chalk, barium sulfate, quartz, talc, kaolin, calcium sulfate and/or calcium silicate. The filler may be used alone or as a mixture of two or more.

As pigments, the carrier material may preferably contain iron oxide, titanium dioxide, zinc sulfide, zinc oxide and/or organic or inorganic color pigments.

The carrier material may for example contain highly dispersed silica, bentonites or modified bentonites, polyacrylates and/or cellulose derivatives, such as cellulose ethers, as additives for adjusting the rheological properties.

The additives may be present in an amount of from approximately 0.25 to 2.5 wt. %, preferably 0.5 to 1.7 wt. %, particularly preferably 0.8 to 1.6 wt. % in the relevant fire protection layer, based on the sum of the solids content of the carrier material and the physically acting blowing agent.

The fire protection layers preferably each have an average maximum layer thickness of ≤10 mm, more preferably ≤8 mm, and particularly preferably ≤5 mm. In a preferred embodiment, the fire protection layer has an average layer thickness of from 0.5 mm to 4.6 mm. The two or more fire protection layers of the layered body can have the same or different average layer thicknesses. However, it is preferred for the fire protection layers of the layered body to have approximately the same average layer thicknesses.

The functional layer, which is arranged between the fire protection layers, according to the invention has a temperature resistance up to at least 300° C. Preferably, the functional layer has a temperature resistance up to at least 400° C., more preferably up to at least 450° C., even more preferably up to at least 500° C., and most preferably up to at least 550° C. In the context of the present invention, the term temperature resistance means the resistance of the functional layer to high temperatures. When the temperature resistance is exceeded, the temperature-dependent properties can change so significantly that the material no longer meets the requirements or is destroyed. In the context of the present invention, temperature resistance means in particular that, up to the specified temperature limit, no decomposition, melting or burning or other serious change in the material properties takes place which results in the mode of action of the functional layer being lost.

The functional layer preferably extends continuously between the fire protection layers. This is understood to mean that the functional layer is not interrupted within the layered body.

It is essential to the invention that the functional layer comprises at least one semi-rigid material or preferably consists of at least one semi-rigid material.

In the context of the present invention, the term "semi-rigid material" is understood to mean a material which has both sufficient mechanical strength to be able to absorb the inflation pressure emanating from the fire protection layer and sufficient flexibility such that the expansion of the physically acting blowing agent is not hindered.

Preferably, the semi-rigid material is selected from the group consisting of fiber composite materials, metals, metal alloys and combinations thereof.

In one embodiment of the invention, the functional layer comprises a fiber composite material. The fiber composite material may comprise a technical fiber from the group consisting of glass fiber, ceramic fiber, carbon fiber, polyamide fiber, metal fiber, boron fiber, natural fiber, rock fiber and mixtures thereof. It is advantageous for the fiber composite material to be composed of mono- and/or continuous filaments, resulting in a stable continuous thread. These continuous threads are preferably bonded together so as to have a high tensile strength.

In another embodiment of the invention, the functional layer is formed from one or more metals and/or one or more metal alloys, in particular aluminum and/or iron.

The functional layer is preferably formed from a structure that is continuous in at least two dimensions. It is preferred for the functional layer to be formed as a film, as a perforated plate, as a mat, as a grid or as a woven fabric.

It has proven advantageous for the semi-rigid material to be selected from the group consisting of expanded metal, glass fiber material, aluminum foil and combinations thereof.

Preferably, the semi-rigid material comprises a glass fiber material, in particular a glass fiber non-woven fabric, a glass fiber laid scrim, a glass fiber knitted fabric, a glass fiber woven fabric or combinations thereof. In order to achieve a sufficient temperature stability in glass fiber materials that have no direct interweaving, such as a glass fiber non-woven fabric or glass fiber knitted fabrics, the individual threads must be fixed to one other by means of an adhesive which has a sufficient temperature stability. Epoxy-based adhesives which preferably have a temperature stability of at least 180° C., more preferably at least 205° C., and in particular at least 220° C., are suitable for this purpose, for example. The glass fiber material preferably has a weight per unit area in the range of from 50 to 1500 $g/m^2$, preferably in the range of from 100 to 1300 $g/m^2$, more preferably 150 $g/m^2$ to 900 $g/m^2$ and in particular in the range of from 180 to 700 $g/m^2$. It is preferred for the glass fiber material to be a glass material reinforced with steel fibers, in particular a glass fiber woven fabric reinforced with steel fibers. Corresponding glass fiber woven fabrics reinforced with steel fibers are available, for example, from HKO.

In a particularly preferred embodiment, the semi-rigid material is a glass fiber woven fabric and the functional layer consists thereof; in particular, the glass fiber woven fabric has a weight per unit area of from 180 to 700 $g/m^2$.

Alternatively, the semi-rigid material preferably comprises at least one expanded metal. The expanded metal preferably has an average mesh size of ≤15 mm×10 mm, preferably ≤12 mm×9 mm and in particular ≤10.5 mm×7 mm, the lower limit of the average mesh size being ≤1.2 mm×0.6 in each case. In a particularly preferred embodiment, the semi-rigid material is an expanded metal and the functional layer consists thereof; in particular, the expanded metal has an average mesh size of from 6 mm×3.4 mm to 2.5 mm×1.7 mm.

The average layer thickness of the functional layer may in principle be less than, equal to or greater than the average layer thickness of the fire protection layer. Expediently, the ratio of the average layer thickness of a fire protection layer to the average layer thickness of a functional layer in the layered body is from 1:3 to 10:1. If the functional layer is very thin, for example ≤50 μm, the ratio may also deviate from the aforementioned range. Here, the ratio of the average layer thickness of the fire protection layer to the average layer thickness of the functional layer in the fire protection element is preferably from 1:1 to 50:1. The functional layer preferably has a maximum average layer thickness of ≤5 mm, more preferably ≤2.5 mm, and particularly preferably ≤1 mm. In a preferred embodiment, the functional layer has a layer thickness of from 8 μm to 1.5 mm.

If the layered body has more than one functional layer, the functional layers can be the same or different. In this case, however, it is advantageous for the functional layers present in the layered body to be structured as identically as possible. The two or more functional layers of the layered body can have the same or different average layer thicknesses. However, it is preferred for the functional layers of the layered body to have approximately the same average layer thicknesses.

Optionally, one or more fire protection layers and/or one or more functional layers may additionally comprise one or more intermediate layers (6). An adhesive layer which is used to produce at least a partially firm bond between the fire protection layers and the functional layer is considered as an intermediate layer, for example. The materials commonly used and known in the art are considered for the production of the adhesive layer. These include, for example, the materials listed in document EP1161348 A1, the contents of which are hereby incorporated into the present application.

The intermediate layer preferably has an average maximum layer thickness of ≤0.1 mm, more preferably ≤0.05 mm, and particularly preferably ≤0.025 mm. In a preferred embodiment, the intermediate layer has a layer thickness of from 5 μm to 0.025 mm. If the fire protection element according to the invention comprises two or more intermediate layers, these intermediate layers can have the same or different layer thicknesses. It is preferred that the intermediate layers of the fire protection element have approximately the same layer thicknesses.

But it is also possible to produce a substantially firm bond without the use of an adhesive layer. In this preferred embodiment, the functional layer is placed and/or pressed into the not-yet dried carrier material of the fire protection layer and then the carrier material is cured by physical drying.

For the formation of the layered body according to the present invention, theoretically a large number of fire protection layers and functional layers can be combined with one another. However, it is expedient that, for the use in the fire protection element according to the invention, the layered body overall has a maximum of 21 layers (sum of fire protection layers and functional layers).

The fire protection element according to the invention can be configured in all forms that geometrically allow the use as a fire protection element. In a preferred embodiment, the fire protection element is strip-shaped and is in the form of an endless bandage.

DESCRIPTION OF THE DRAWINGS

Embodiments will be explained in more detail with reference to the accompanying drawings.

Figure 1:
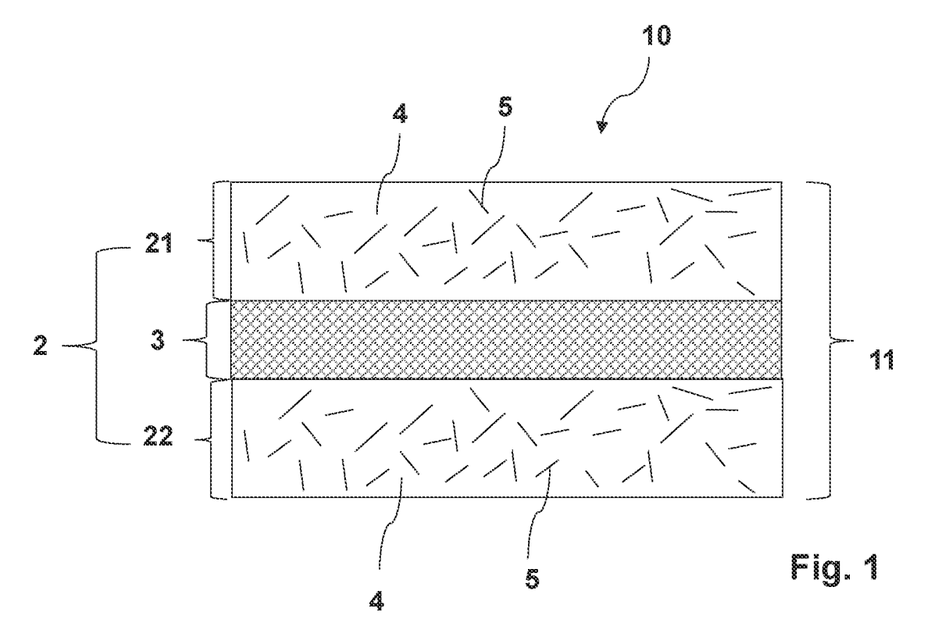
FIG. 1 shows a cross section of an embodiment of a fire protection element according to the invention.
Figure 2:
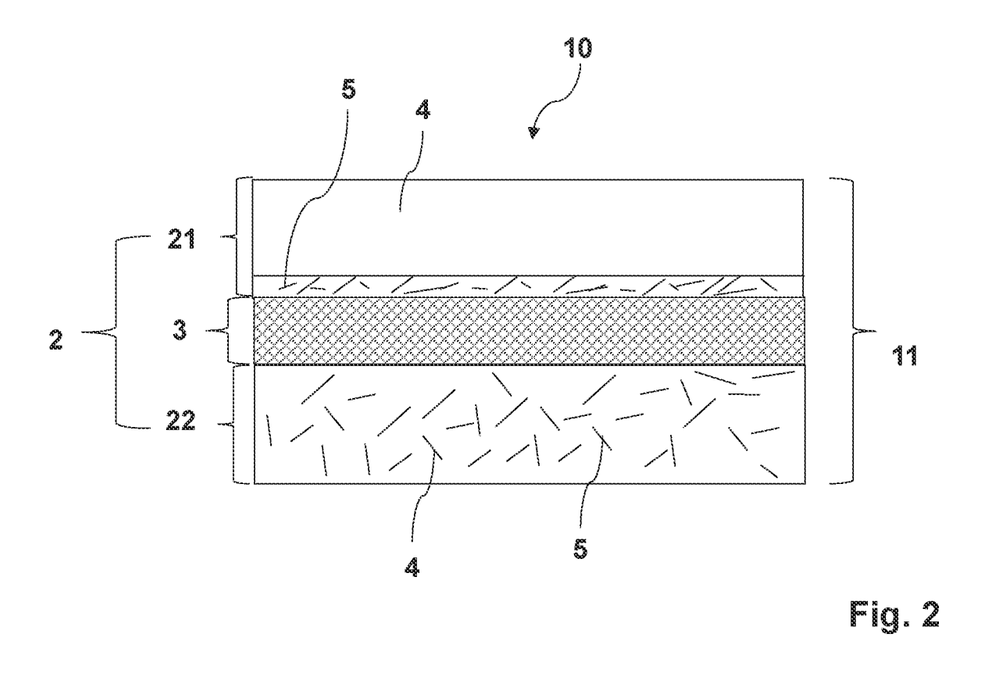
FIG. 2 shows a cross section of an alternatively preferred embodiment of a fire protection element according to the invention.
Figure 3:
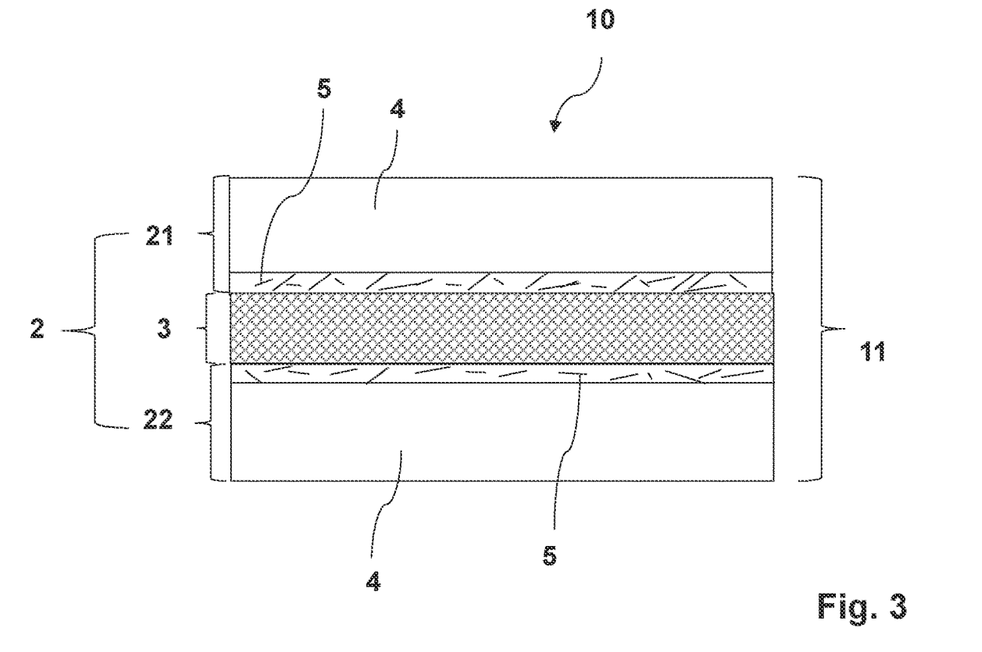
FIG. 3 shows a cross section of a further alternatively preferred embodiment of a fire protection element according to the invention.
Figure 4:
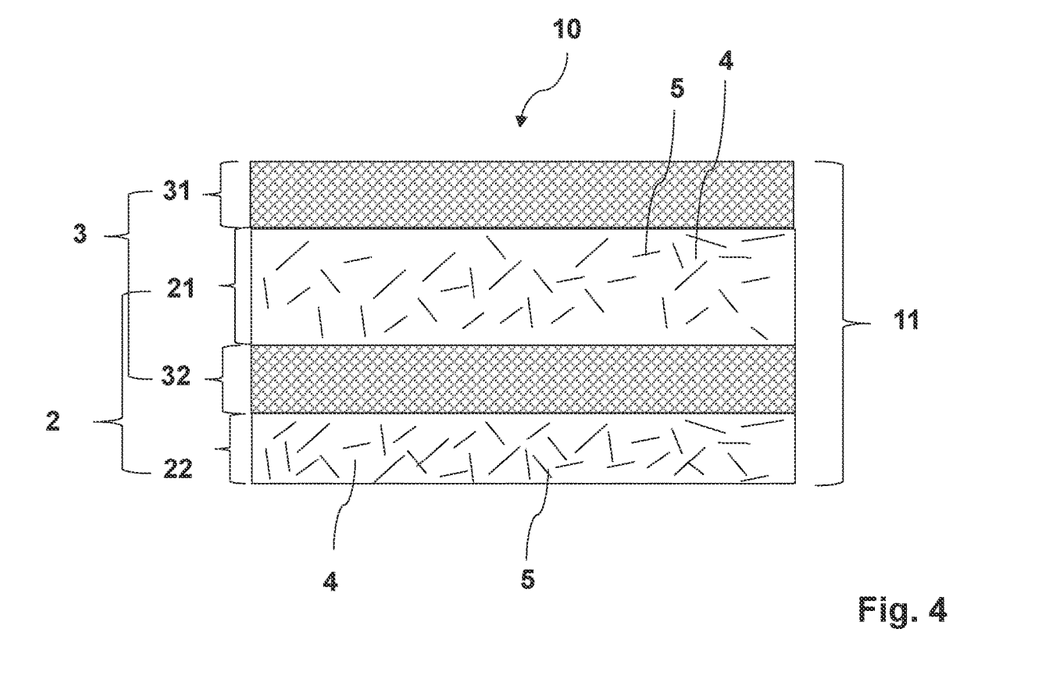
FIG. 4 shows a cross section of a preferred layered body according to the invention comprising two fire protection layers and two functional layers.
Figure 5:
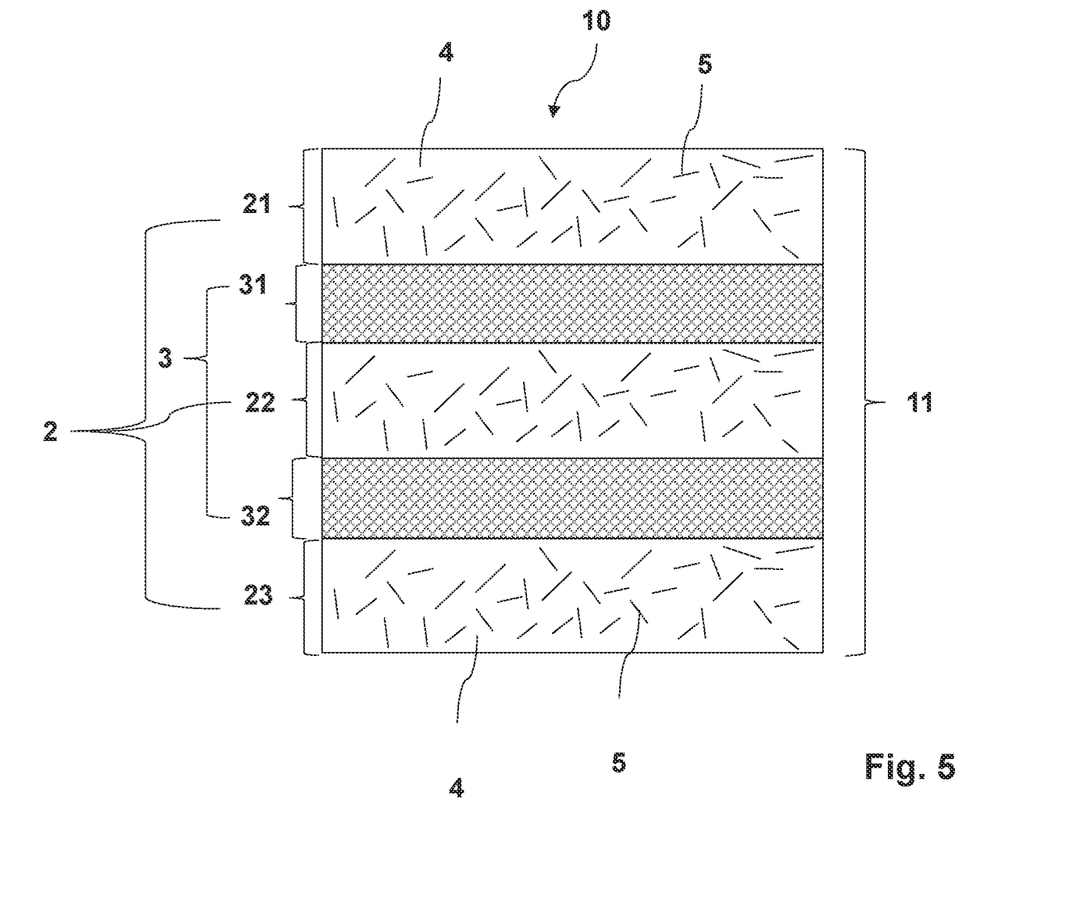
FIG. 5 shows a cross section of a preferred layered body according to the invention comprising three fire protection layers and two functional layers.
Figure 6:
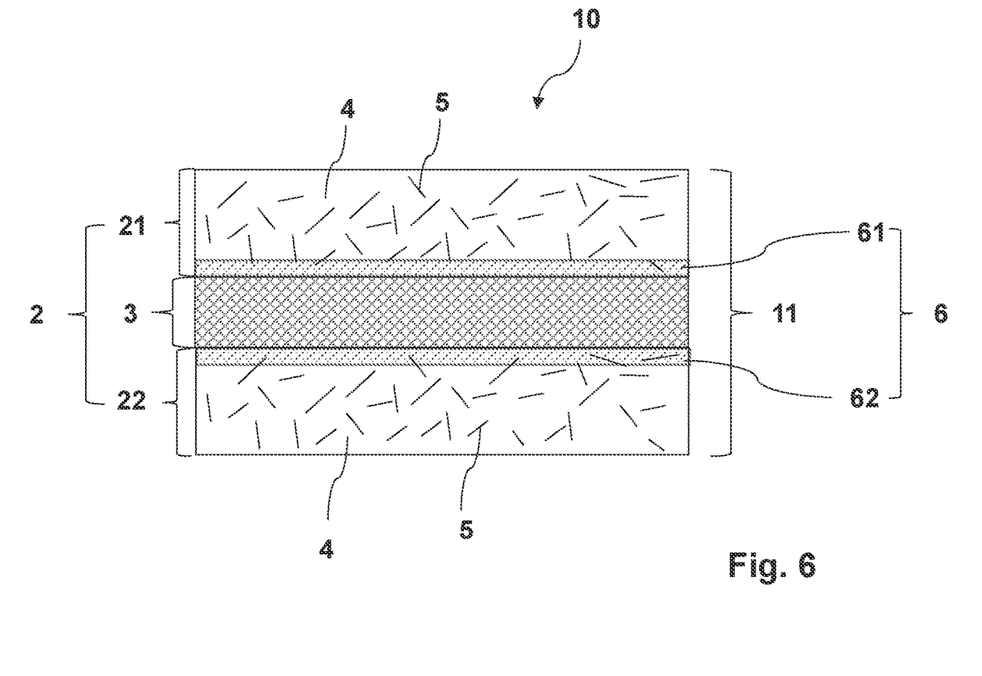
FIG. 6 shows a cross section of a preferred embodiment of a fire protection element according to the invention comprising additional intermediate layers arranged in the fire protection layers.

FIG. 1 shows a cross section of an embodiment of a fire protection element according to the invention;

FIG. 2 shows a cross section of an alternatively preferred embodiment of a fire protection element according to the invention;

FIG. 3 shows a cross section of a further alternatively preferred embodiment of a fire protection element according to the invention;

FIG. 4 shows a cross section of a preferred layered body according to the invention comprising two fire protection layers and two functional layers;

FIG. 5 shows a cross section of a preferred layered body according to the invention comprising three fire protection layers and two functional layers;

FIG. 6 shows a cross section of a preferred embodiment of a fire protection element according to the invention comprising additional intermediate layers arranged in the fire protection layers.

FIG. 1 shows a cross section of an embodiment of a fire protection element (10) according to the invention comprising a three-layer layered body (11). The layered body (11) comprises the two fire protection layers (21) and (22). A functional layer (3) is arranged between the two fire protection layers (21) and (22) and is substantially firmly bonded to the fire protection layer (21) and the fire protection layer (22) in order to form the layered body (11). The fire protection layers each comprise a carrier material (4) and a physically acting blowing agent (5), wherein the physically acting blowing agent (5) is embedded within the carrier material and is distributed substantially uniformly within the carrier material.

FIG. 2 shows a cross section of an alternative embodiment of a fire protection element (10) according to the invention comprising a three-layer layered body (11). The layered body (11) comprises the two fire protection layers (21) and (22). A functional layer (3) is arranged between the two fire protection layers (21) and (22) and is substantially firmly bonded to the fire protection layer (21) and the fire protection layer (22) in order to form the layered body (11). The fire protection layers each comprise a carrier material (4) and a physically acting blowing agent (5). In the fire protection layer (22), the physically acting blowing agent (5) is embedded within the carrier material and is distributed substantially uniformly within the carrier material. In the fire protection layer (21), the physically acting blowing agent (5) is applied to the area of the surface of the carrier material (4) that faces the functional layer (3).

FIG. 3 shows a cross section of a further alternatively preferred embodiment of a fire protection element (10) according to the invention comprising a three-layer layered body (11). In the two fire protection layers (21) and (22), the physically acting blowing agent (5) is applied to the area of the surface of the carrier material (4) that faces the functional layer (3).

FIG. 4 shows a cross section of a fire protection element (10) according to the invention with a layered body (11) comprising two fire protection layers (21) and (22) and two functional layers (31) and (32). The functional layer (32) is arranged between the fire protection layers (21) and (22) and the functional layer (31) is arranged on the fire protection layer (21), with the fire protection layers (2) and functional layers (3) that are adjacent to one another being substantially firmly bonded to one another. The layered body (11) thus has a four-layer structure. The fire protection layers each comprise a carrier material (4) and a physically acting blowing agent (5), the physically acting blowing agent (5) being embedded within the carrier material. The fire protection layers (21) and (22) have different layer thicknesses and the functional layers (31) and (32) have the same layer thicknesses.

FIG. 5 shows a cross section of a fire protection element (10) according to the invention comprising a layered body (11) having three fire protection layers (21), (22) and (23) and two functional layers (31) and (32). The functional layer (31) is arranged between the fire protection layers (21) and (22) and the functional layer (32) is arranged between the fire protection layers (22) and (23), with the fire protection layers (2) and functional layers (3) that are adjacent to one another being substantially firmly bonded to one another.

FIG. 6 shows a cross section of a preferred embodiment of a fire protection element (10) according to the invention with a layered body (11) comprising the two fire protection layers (21) and (22). A functional layer (3) is arranged between the two fire protection layers (21) and (22). The fire protection layers (21) and (22) additionally each comprise an intermediate layer (61) and (62), for example in the form of an adhesive layer, for establishing a substantially firm bond between the fire protection layer (2) and functional layer (3) that are adjacent to one another.

The invention is not limited to the embodiments shown. In particular, individual features of one embodiment can be contained independently of the other features of the corresponding embodiment in a further embodiment according to the invention, i.e. the features described can be combined with one another as desired.

According to a second aspect of the present invention, a method for producing the fire protection element according to the invention is provided. The method according to the invention comprises the following steps:

i) Providing a first fire protection layer (21), ii) Providing a functional layer (3), iii) Connecting the fire protection layer (21) and the functional layer (3) to produce a two-layer layered body, iv) Providing a second fire protection layer (22), v) Connecting the second fire protection layer (22) and the two-layer layered body produced in step iii) and vi) Establishing a substantially firm bond between the fire protection layers (21) and (22) and the functional layer (3) arranged between the fire protection layers (21) and (22).

The statements made above with respect to the fire protection element according to the invention apply equally to the method according to the invention, where applicable.

A substantially firm bond between the fire protection layers and the functional layer arranged between the fire protection layers is preferably established by applying pressure, for example by compression, and/or by using a suitable intermediate layer, for example in the form of an adhesive layer.

However, it is also possible to produce a fire protection element within the meaning of the present invention by first providing a functional layer (3) which is cast into a formulation containing a carrier material and at least one physically acting blowing agent. The fire protection layers (2) between which the functional layer (3) is arranged are obtained by drying or curing the corresponding formulation.

The present invention also relates to the use of a fire protection element according to the invention for sealing passage openings and/or joints in components against fire and flue gases.

The invention is further illustrated by the following examples.

PRACTICAL EXAMPLES

Formulations 1 and 2 were prepared with the constituents specified in Table 1, and the indicated constituents were mixed together. The prepared formulations comprise a carrier material as well as a physically acting blowing agent and can be used as a starting material for the production of the fire protection layers. The corresponding constituents are specified in the table below.

TABLE 1

Constituents of the starting material for producing the fire protection layers

|  | 1 [wt. %] | 2 [wt. %] |
|---|---|---|
| Aqueous acrylate dispersion (65% acrylate and 35% water) | 29.00 | 42.0 |
| Expandable graphite (Kaisersberg) | 6.00 | 44.0 |
| Ammonia (ammonium hydroxide, 25% in water) | 1.26 | 0.1 |
| Short cut glass fiber (diameter~10 μm, length 6 mm) | 1.10 | 5.2 |
| Ammonium polyphosphate | 10.0 | 8.7 |
| Emulsifier | 0.20 | — |
| Dispersant | 0.50 | — |
| Plasticizer (Indopol) | 5.50 | — |
| Monopropylene glycol | 1.00 | — |
| Fungicide | 0.30 | — |
| Thickener | 0.14 | — |
| Water | 8.40 | — |
| Kaolin (Capsil 2004) | 25.60 | — |
| Foam glass beads (Poraver 40-125 μm) | 10.00 | — |
| Iron oxide | 1.00 | — |

The compositions obtained from formulations 1 and 2 were formed into a strip-shaped fire protection layer. For this purpose, the resulting masses were rolled out with a roller to the desired layer thickness. Various semi-rigid materials were used as the functional layer for the production of fire protection elements according to the invention. Fire protection elements having a three-layer structure consisting of two fire protection layers and a functional layer arranged between the fire protection layers were produced. The fire protection layers and functional layers adjacent in each case were substantially firmly bonded to one another by pressing. If substantially firm bonds could not be obtained by pressing, a small amount of the aqueous acrylate dispersion was additionally applied between the layers in order to obtain a substantially firm bond.

The semi-rigid material of the functional layer is specified in Tables 2 and 3.

To determine the expansion properties of the fire protection elements, a device for function replacement testing was used to determine the height of the expansion (upward direction of the expansion). To compare the different fire protection elements, the so-called expansion factor was determined from these measurements, which represents the quotient of the expansion height of the relevant fire protection element with respect to the total weight of all fire protection layers of the fire protection element. The measuring device for performing the function replacement test consisted of two horizontally arranged heatable plates. The top plate had a constant weight. Fire protection elements to be measured (circular, diameter 45 mm) were arranged between the heatable plates and subjected to a temperature program (starting temperature 50° C., heating rate 20° C./min, intermediate temperature 100° C. (5 min), heating rate 20° C., final temperature 500° C. (15 min hold time). The top plate was able to record the expansion of the fire protection elements in height.

In an expansion test, it was first shown that fire protection elements having a plurality of thinner fire protection layers without a functional layer show the same performance as a fire protection element having only one fire protection layer of the same layer thickness (sum of the layer thicknesses of all fire protection layers).

To compare different functional layers, the relative performance of fire protection elements was determined, which is defined as the quotient of the expansion factor of a fire protection element with an intermediate layer and the expansion factor of a reference sample without an intermediate layer. The expansion factor is calculated on the basis of a reference line, which was established in advance by measuring the expansion behavior with samples of different thicknesses. All fire protection elements having a relative performance of greater than 1 show improved performance and are in accordance with the invention. The determined reference lines for the two formulations 1 and 2 are specified in the text accompanying Tables 2 and 3.

TABLE 2

Relative performance of different functional layers, fire protection layers according to formulation 1. The expansion factor y was calculated from the reference line y = 8.23 * $x^{-1.46}$ (x = weight of the sample), which was determined using fire protection layers of different thicknesses (diameter 4.5 cm; approx. 5.0 to 17.0 g; $R^2$ = 0.98)

| Functional layer (all dimensions in mm) | Relative performance |
|---|---|
| Standard without intermediate layer | 1.00 |
| Glass fiber woven fabric (cross-body, weight per unit area 200 g/m²; thickness 0.25 mm; thread count warp/weft 17/12; maximum tensile force warp/weft < 2500/ > 1800 N/5 cm according to ISO 4606) | 1.73 |
| Aluminum foil (30 μm) | 1.11 |
| Expanded metal (aluminum 99.5 hh, web width 0.5, web thickness 0.5, mesh size 6.0, mesh height 3.4, total thickness 1.0) | 1.51 |

TABLE 3

Relative performance of different functional layers, fire protection layers according to formulation 2. The expansion factor y was calculated from the reference line y = 16.66 * $x^{-1.52}$ (x = weight of the sample), which was determined using fire protection layers of different thicknesses (diameter 4.5 cm, approx. 7.0 to 18.0 g; $R^2$ = 0.95)

| Functional layer (all dimensions in mm) | Relative performance |
|---|---|
| Standard without intermediate layer | 1.00 |
| Glass fiber woven fabric (cross-body, weight per unit area 200 g/m², thickness 0.25 mm; thread count warp/weft 17/12; maximum tensile force warp/weft < 2500/ > 1800 N/5 cm according to ISO 4606) | 1.43 |
| Aluminum foil (30 μm) | 1.17 |
| Expanded metal (aluminum 99.5 hh, web width 0.5, web thickness 0.5, mesh size 6.0, mesh height 3.4, total thickness 1.0) | 1.38 |

The invention claimed is:

1. A fire protection element, comprising:
   a layered body, wherein the layered body comprises at least two fire protection layers; and
   at least one functional layer arranged between the at least two fire protection layers,
   wherein the at least two fire protection layers each comprise a carrier material and at least one physically acting blowing agent,
   wherein the at least one functional layer has a temperature resistance up to at least 300° C.,
   wherein the at least two fire protection layers and the at least one functional layer arranged between the at least two fire protection layers are substantially firmly bonded to one another to form the layered body such that bonds resulting from molecular forces hold the layers together in such a way that they form a solid body in their entirety,
   wherein the at least one functional layer comprises at least one semi-rigid material, and wherein the layers are substantially firmly bonded by one or more of welding, soldering, or gluing,
   wherein said functional layer is placed and/or pressed into a not-yet dried carrier material of at least one of said at least two fire protection layers and then said carrier material is cured by physical drying.

2. The fire protection element according to claim 1, wherein the at least one physically acting blowing agent is embedded into the carrier material.

3. The fire protection element according to claim 1, wherein the at least one physically acting blowing agent is applied to one or more areas of a surface of the carrier material.

4. The fire protection element according to claim 1, wherein the carrier material has a softening or decomposition point in a range of from 80° C. to 500° C.

5. The fire protection element according to claim 1, wherein the carrier material comprises a polymer dispersion based on water or solvent.

6. The fire protection element according to claim 1, wherein the at least one physically acting blowing agent is selected from a group consisting of graphite intercalation compounds, phyllosilicate intercalation compounds, perlites, and mixtures thereof.

7. The fire protection element according to claim 1, wherein the at least one semi-rigid material is selected from a group consisting of fiber composite material, metal, metal alloys, and combinations thereof.

8. The fire protection element according to claim 1, wherein the at least one semi-rigid material is formed as a film, as a perforated plate, as a mat, as a grid, or as a woven fabric.

9. The fire protection element according to claim 8, wherein the at least one semi-rigid material is selected from a group consisting of expanded metal, glass fiber woven fabric, aluminum foil, and combinations thereof.

10. The fire protection element according to claim 1, wherein one or more of the at least two fire protection layers and/or the at least one functional layer additionally comprise one or more intermediate layers.

11. The fire protection element according to claim 1, wherein each of the at least two fire protection layers has a maximum average layer thickness of ≤10 mm.

12. The fire protection element according to claim 1, wherein a ratio of the average layer thickness of the at least two fire protection layers to the average layer thickness of the at least one functional layer in the layered body is from 1:3 to 10:1.

13. The fire protection element according to claim 1, wherein the layered body is strip-shaped.

14. A method for producing a fire protection element according to claim 1, the method comprising:
   i) providing a first fire protection layer,
   ii) providing a functional layer,
   iii) connecting the first fire protection layer and the functional layer, to produce a two-layer layered body,
   iv) providing a second fire protection layer,
   v) connecting the second fire protection layer and the two-layer layered body produced in iii), and
   vi) establishing a substantially firm bond between the first fire protection layer, the second fire protection layer, and the functional layer arranged between the first fire protection layer and second fire protection layer, such that bonds resulting from molecular forces hold the layers together in such a way that they form a solid body in their entirety.

15. A method for sealing passage openings and/or joints in components against fire and flue gases with the fire protection element according to claim 1, the method comprising:
   expanding the fire protection element in the passage openings and/or joints in components.

16. A method for sealing passage openings and/or joints in components against fire and flue gases with a fire protection element, the method comprising:
   expanding a fire protection element produced using the method according to claim 14, in the passage openings and/or joints in components.

17. The fire protection element according to claim 3, wherein the at least one physically acting blowing agent is applied to one or more areas of the surface of the carrier material that faces the functional layer.

18. The fire protection element according to claim 1, wherein the layers are substantially firmly bonded by a process consisting of one or more of welding, soldering, or gluing.

19. The fire protection element according to claim 1, wherein the carrier material comprises an aqueous acrylate dispersion.

20. The fire protection element according to claim 19, wherein the at least one physically acting blowing agent comprises expandable graphite and wherein the at least one semi-rigid material comprises glass fiber.

21. The fire protection element of claim 1, which does not include an adhesive layer.

22. The fire protection element of claim 1, wherein the layers are substantially firmly bonded by one or more of welding or soldering.

* * * * *